United States Patent [19]

Rosenberg et al.

[11] 4,325,713

[45] Apr. 20, 1982

[54] AIR POLLUTION CONTROL PROCESS AND APPARATUS

[75] Inventors: Harvey S. Rosenberg, Columbus, Ohio; Joseph M. Genco, Orono, Me.

[73] Assignee: Industrial Resources, Inc., Chicago, Ill.

[21] Appl. No.: 930,296

[22] Filed: Jul. 31, 1978

Related U.S. Application Data

[63] Continuation of Ser. No. 519,634, Oct. 31, 1974, abandoned.

[51] Int. Cl.³ .......................... B01D 53/14; C01F 1/74
[52] U.S. Cl. ............................................. 55/73; 55/89; 423/242
[58] Field of Search .............................. 423/242–244; 55/73, 89

[56] References Cited

U.S. PATENT DOCUMENTS

| | | | |
|---|---|---|---|
| 2,231,309 | 2/1941 | Weber | 423/242 |
| 3,533,748 | 10/1970 | Finfer et al. | 423/242 |
| 3,929,968 | 12/1975 | Taub | 423/242 |
| 4,039,304 | 8/1977 | Bechthold et al. | 55/73 X |

OTHER PUBLICATIONS

SO₂ Removal Without Sludge, Rockwell International, pp. 1–4, Jul. 1974.

Primary Examiner—Robert H. Spitzer
Attorney, Agent, or Firm—Jacques M. Dulin

[57] ABSTRACT

Improved combination wet absorber/spray-dry dry wastes collection air pollution control process and apparatus therefor, employing aqueous solutions of sodium or ammonium alkali sorbents injected in an absorber through which $SO_x$-containing flue or process gases containing fly ash are passed. Fly ash is collected in the absorber wherein the alkali reacts with the $SO_x$ to form sodium and ammonium sulfur oxide salts liquor containing collected fly ash in slurry form, which is passed back upstream and injected into a spray dryer through which the gases pass. The heat of the gases in the spray dryer dries the slurry to a powder of salts and fly ash which is removed. The spray dryer simultaneously provides some added preliminary $SO_x$ removal.

6 Claims, 1 Drawing Figure

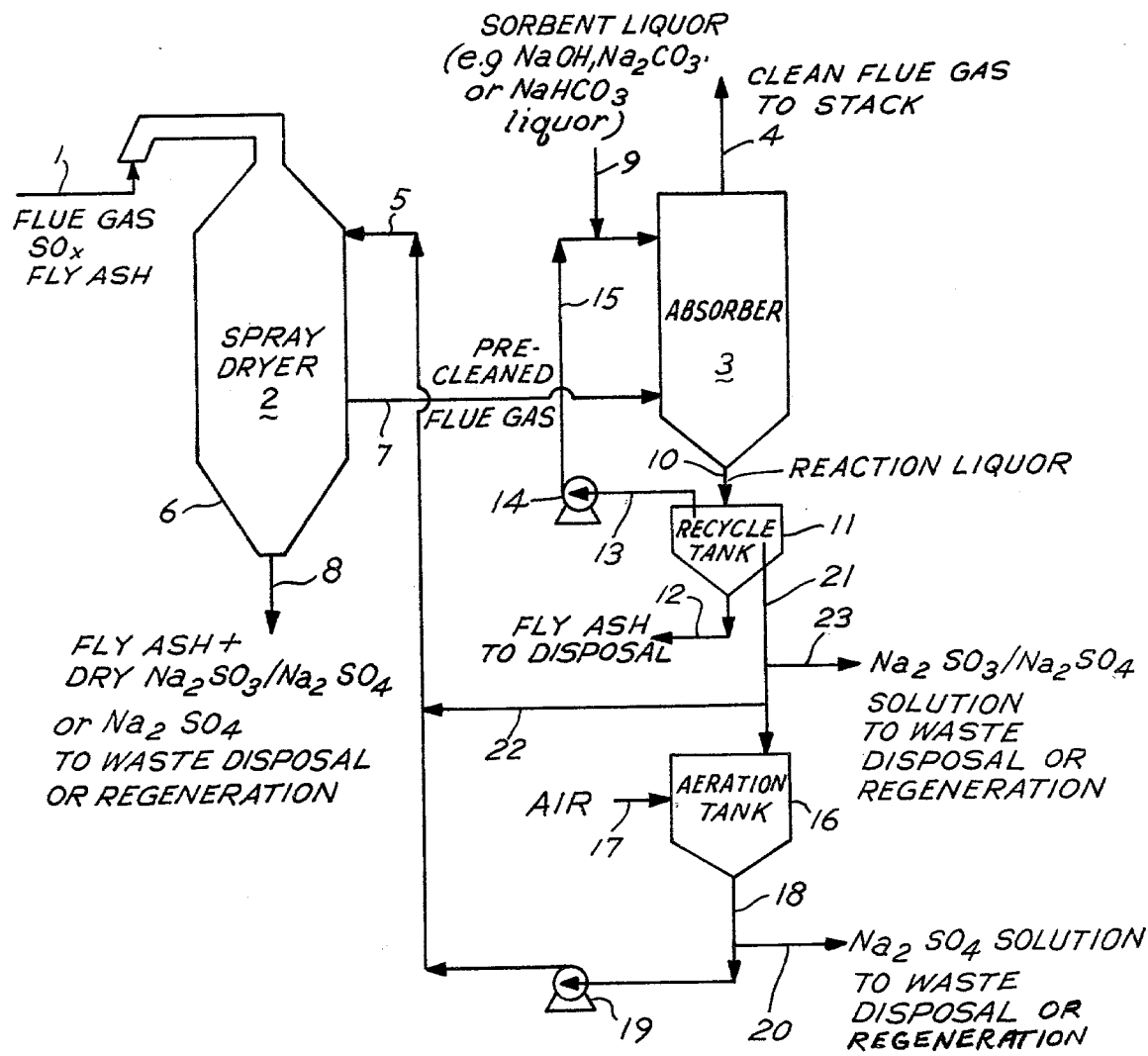

AIR POLLUTION CONTROL PROCESS AND APPARATUS

This is a continuation of application Ser. No. 519,634 filed Oct. 31, 1974, now abandoned.

FIELD

Improved air pollution control process and apparatus for removal of $SO_x$ and fly ash from industrial and power plant flue gases employing an aqueous absorber and spray dryer upstream of the scrubber. Aqueous solutions of sodium or ammonium alkalis are employed as the $SO_x$ sorbents.

BACKGROUND

The Atomics International "Aqueous Carbonate Process" employs a spray dryer assembly to remove $SO_x$ from flue gases. In this process, an aqueous solution of sodium carbonate is sprayed at low l/g ratios into the spray dryer through which flue gases containing fly ash are passed. The $SO_x$ reacts with the $Na_2CO_3$ to form $Na_2SO_3$ and $Na_2SO_4$ while the heat dries the droplets to powder form. The powdered $Na_2SO_3$, $Na_2SO_4$ and fly ash is then collected in a cyclone and electrostatic precipitator downstream before the cleaned flue gas is exhausted to the atmosphere.

This process is a single-stage $SO_x$ removal process, and employs two types of particulates clean-up apparatus: the cyclone portion of the spray dryer and an electrostatic precipitator. Both clean-up units are downstream of the aqueous spray dryer reactor which receives the full gas volume containing both fly ash and $SO_x$ without pretreatment. The grain loading for the cyclone and electrostatic precipitator is much higher than usual, i.e., fly ash alone, because of the added $Na_2SO_3$ and $Na_2SO_4$. As a consequence, some sulfites and sulfates can blow by these devices and be exhausted to the atmosphere. The $SO_x$ removal efficiency is entirely dependent on control conditions in the spray dryer apparatus which acts both as a reactor and a dryer, and in part also acts as a collector.

THE INVENTION

OBJECTS

It is an object of this invention to provide an improved air pollution control process and apparatus for removal of both $SO_x$ and fly ash from industrial and power plant exhaust gases.

It is another object to provide an air pollution control process and apparatus employing the heat of the flue gases to dry a reaction product liquor resulting from reaction of $SO_x$ with an aqueous solution of a sodium or ammonium alkali in a separate reactor.

It is another object of the invention to provide the principal reaction of $SO_x$ with aqueous sorbent downstream of the collection of reaction product and fly ash.

It is another object to provide an aqueous system polishing apparatus downstream of the principal waste product (reaction product and fly ash) collection device which prevents blow-by of dry waste product as well as provides the principal zone of $SO_x$ reaction.

It is another object of the invention to provide an improved air pollution control process and apparatus that has the potential for high $SO_x$ and fly ash removal efficiency as well as stoichiometric or better utilization of sorbent.

It is another object of the invention to provide an $SO_x$ removal process that can produce a dry or wet waste product.

Still other objects will be evident from the following description which has reference to the FIGURE.

FIGURE

The FIGURE shows schematically the arrangement of the parts of the apparatus in the operation of the process.

SUMMARY

A countercurrent absorber is provided through which partially precleaned flue gases are passed into contact with an aqueous solution of sodium or ammonium alkali which react with the $SO_x$, i.e., $SO_3$ and $SO_2$, in the flue gas to form the corresponding Na or $NH_4$ sulfite and sulfate compounds in a reaction liquor. The reaction liquor is passed to a recycle tank where fly ash is let settle and removed as an underflow, a first portion is recycled to the absorber, and a second portion is passed to one or more of three alternate stages. In the first alternative, the second portion of waste $(NH_4)_2$ or $Na_2SO_3/SO_4$ liquor may be passed directly to waste disposal or be regenerated, e.g., by reaction with lime and/or limestone to form $NH_4$ or $NaOH$ and $CaSO_3/SO_4$ with the $NH_4$ or $NaOH$ being recycled to the absorber.

In a second alternative, the $(NH_4)_2$ or $Na_2SO_3/SO_4$ solution is passed to an aeration tank in which air is introduced to convert the sulfite to sulfate. The resulting $NH_4$ or $Na_2SO_4$ liquor may be disposed of or regenerated as above. It is preferably passed to the spray dryer for conversion to and collection as dry $(NH_4)_2$ or $Na_2SO_4$.

The third alternative is to pass the $(NH_4)_2$ or $Na_2SO_3/SO_4$ liquor to a spray dryer where the heat from incoming flue gas evaporates the water content of the liquor leaving dry $(NH_4)_2$ or $Na_2/SO_4$. The dry product is collected along with a portion of the fly ash in the cyclone stage of the spray dryer. In addition, some $SO_x$ removal occurs in the spray dryer, resulting in partially precleaned flue gas. It is this flue gas which is then passed to the countercurrent aqueous absorber. In the case of $NH_4$-alkalis, the temperature of the dried waste material $(NH_4)_2SO_3/SO_4$ must be kept below 150° C. to prevent decomposition of $(NH_4)_2SO_3$, or below 280° C. to prevent decomposition of the $(NH_4)_2SO_4$.

The preferred embodiment calls for passing the aerated reaction liquor $(NH_4)_2SO_4$ or $Na_2SO_4$, or the non-aerated liquor $(NH_4)_2SO_3/SO_4$ or $Na_2SO_3/SO_4$ to the spray dryer rather than to waste disposal. The solids content of the absorber input liquors, both sorbent ($NH_4$ or Na hydroxide, carbonate or bicarbonate) and recycle liquor, are controlled in relation to the temperature and volume of gas passing into the spray dryer to insure the desired amount of drying. The concentration of the sorbent liquor is maintained to provide the desired amount of $SO_x$ removal in the sorber.

The sorber picks up waste particulates blown through the spray dryer, including residual fly ash and dried $(NH_4)_2$ or $Na_2SO_3/SO_4$. Clean flue gases are passed from the sorber (which includes a demister) to the stack directly, or may optionally pass through a reheater stage where required ejection characteristics may be provided.

DETAILED DESCRIPTION

In the FIGURE, flue gas 1 passes from left to right through a spray dryer 2 and an absorber 3 in which the flue gas is cleaned by removal of $SO_x$ and fly ash. The clean flue gas 4 is then passed to a stack and ejected to the atmosphere. The flue gas may range in temperature from about 275° up to 800° F. depending on the source of the flue gas, and the clean flue gas exiting from the dryer 2 or absorber 3 may range in temperature from about 100° to 180° F. depending on the inlet gas humidity in the range of 0–20 weight %. The spray dryer is arranged upstream from the countercurrent absorber so the absorber picks up particulates (dry salts and fly ash) blown through the dryer.

A reaction product liquor bleed stream, to be described in more detail below, enters the spray dryer via line 5. The spray dryer 2 may be of any conventional type, and is designed to completely evaporate the water content of the liquors due to the latent heat in the flue gases 1 passing into the top of the spray dryer 2. In the process, the salts in the reaction product liquors, which may be ammonium or sodium sulfites or sulfates, are completely dried and collected in the hopper portion 6 by the cyclone action of the spray dryer. The solids content, both dissolved solids and any present in undissolved form as a slurry, are kept as high as possible to reduce the amount of evaporation required but not so high that $SO_x$ sorption efficiency by the sorbent liquor is impaired. The solids content may range typically from 5–50% by weight, preferably 15–40%.

At the same time, a portion of the fly ash or other particulate material present in the flue gases 1 is collected with the dried sodium or ammonium sulfur oxide salts. In addition, the reaction product liquors 5 may contain a small portion of the unreacted sodium or ammonium alkali. The presence of this unreacted portion present in the spray dryer may react with any $SO_x$ present in the flue gas. The result is to substantially completely react all of the ammonium or sodium alkali sorbent, and thus result in sodium or ammonium sulfur oxide salts in hopper 6 as well as effect a partial prescrubbing or sorption of the $SO_x$ from the flue gas. At the same time, a portion of the fly ash is removed and the result is a pre-cleaned flue gas 7 which is then passed into the base of the countercurrent absorber column 3. The waste material 8 is removed from the hopper portion of the spray dryer cyclone 6. This waste material includes the dry fly ash product along with the ammonium or sodium sulfur oxide salts. This product is then passed to waste disposal, or the sodium or ammonium sulfur oxide salts may be regenerated to sodium or ammonium alkali and a number of sulfur-containing products such as calcium sulfite/sulfate, sulfur, sulfuric acid or the like.

The precleaned flue gas 7 enters the countercurrent absorber column 3 near its base and passes upwardly through the absorber. The flue gases, still containing a majority of the $SO_x$ and a minority of the fly ash, is contacted by a sorbent liquor 9 which is introduced near the top of the column. The sorbent liquor may be any ammonium or sodium alkali. It is preferred to use sodium hydroxide, sodium carbonate, or sodium bicarbonate liquor. The liquor may be sprayed into the absorber over appropriate contact surfaces such as plastic balls in turbulent motion, or a packed column of ceramic or glass balls. Still other types of sorbent reactors may employ a Venturi system or a series of bubble plates. The sorber ordinarily will contain a demister section of wire mesh or vanes downstream of the sorbent liquor-gases contact section. In the sorber, the fly ash is trapped in the liquor and the $SO_x$ reacts with the alkali to form the corresponding ammonium or sodium sulfur oxide salt. These salts include a mixture of ammonium or sodium sulfite and sulfate salt products which are collected at the base of the sorbent tower and passed via line 10 to a recycle tank 11. The cleaned flue gases exhaust from the top of the absorber column via line 4 and may be passed directly to the stack to be exhausted to the atmosphere. The flue gases temperature exiting the absorber is substantially the same as (within about 5° F. less than) the temperature of the flue gases exiting from the dryer. Optionally, the flue gases may be reheated in order to provide sufficient ejection velocity to reach a required dispersion altitude.

The reaction liquor 10 passes into the recycle tank 11 in which the fly ash is let settle and removed as an underflow via line 12. The fly ash may be sent directly to disposal, or it may be rinsed with fresh water to remove entrained ammonium and sodium sulfur oxide salts. The wash liquor may be used as the make-up liquor for preparing the sorbent liquor 9. Normally, the alkali, preferably a sodium alkali, is in a dry state such as pelleted sodium hydroxide, soda ash or nahcolite ore.

A first portion of the reaction liquor in tank 11 is withdrawn via line 13 and recycled via pump 14 back to the top of the absorber column. This recycle insures relatively complete reaction of all of the ammonium or sodium alkali sorbent in the liquor. The recycle may range from 10 to 60% of the total reaction liquor in line 10.

The liquid/gas ratio of the sorbent liquor 9 plus the recycle liquor 15 may be high or low, but is generally low as compared to calcium alkali sorbents, typically less than about 10, and preferably below about 5 gallons per thousand cubic feet of partially precleaned flue gas 7 entering the absorber reaction zone 3. The solids content is adjusted to insure substantially complete drying of the reaction product liquors 5 passed into the spray dryer 2 without supersaturating the gases with water vapor. This in turn depends on the amount of heat available in the flue gases 1 passing into the spray dryer and the moisture content of the flue gases. Generally, the hotter the flue gas and the lower the amount of $H_2O$ in the flue gas, the lower the solids content or the higher the l/g ratio may be. The lower the moisture content of the input flue gases, the lower the outlet temperature of the flue gas will be. For a power plant having flue gas on the order of 275°–350° F., containing from about 2–20% $H_2O$, the $SO_x$ ($SO_2$ and $SO_3$) will range from about 200–2,000 ppm. For a copper smelter having flue gases in the range of from 500°–800° F., the $SO_x$ may range from 15,000–30,000 ppm.

A middling reaction liquor 21 is withdrawn from the recycle tank 11. This middling liquor is subject to a number of alternatives according to the process and apparatus of this invention. The preferred alternative is to convert the ammonium or sodium sulfur oxide salts, specifically sulfites and sulfates all to the sulfate form before passing it into the spray dryer via line 5. This may be accomplished by passing the middling liquor 21 to an aeration tank 16 into which air 17 is pumped. Since the liquor is relatively warm, being on the order of 100°–180° F., the air will quickly convert the sulfite to sulfate form. The residence time of liquor in the aeration tank may be controlled to insure complete conversion.

The converted liquor 18 is then passed via pump 19 to the spray dryer in which the water is evaporated, and the resulting sodium or ammonium sulfate product is produced as above described. In the case of ammonium sulfate, this product has value as a fertilizer supplement.

The following working description and tables illustrate the critical relationship between the solids content of the waste salts liquor being introduced into the spray dryer and the flue gas temperature. The liquor with its solids (dissolved solids plus undissolved solids, if any, in slurry form) is sprayed into the hot gases coming into the dryer at temperatures in the range of 275°–800° F. and water vapor content of 0–20%. The heat of the gases goes into evaporation of the liquor water content and to heat the solids while the gases are adiabatically humidified. The temperature of the partially cleaned flue gases is lower than the inlet as shown in Table 1. Solids temperature will be substantially the same as the outlet partly cleaned flue gases.

TABLE 1

Gases Temperature Drop Through Dryer

| | Inlet Gas Humidity weight % and water content | | | | |
|---|---|---|---|---|---|
| Inlet Gas T, °F. | 0% 0 lbs H$_2$O/ lb dry gas | 5% 0.0523 lbs | 10% .111 lbs | 15% 0.176 lbs | 20% 0.0250 lbs |
| 300 | 100° F. | 125° F. 0.100 | 140° F. .150 lbs | 153° F. 0.24 | 160° F. 0.30 |
| 400 | 108° F. | 135° F. 0.130 | 145° F. .185 lbs | 156° F. 0.27 | 163° F. 0.33 |
| 500 | 122° F. | 140° F. 0.160 | 151° F. .220 lbs | 159° F. 0.28 | 166° F. 0.36 |
| 600 | 130° F. | 146° F. 0.190 | 154° F. .250 lbs | 163° F. 0.33 | 168° F. 0.42 |
| 700 | 138° F. | 151° F. 0.210 | 158° F. .280 lbs | 165° F. 0.36 | 171° F. 0.45 |
| 800 | 144° F. | 153° F. 0.240 | 161° F. .310 lbs | 167° F. 0.39 | 173° F. 0.49 |

The table may be interpolated from the range of values shown. Since 10% is typical of many power or industrial plants, it is shown in detail. Also shown, just below the outlet temperature values is the amount of water that is in the outlet gas, in lbs, per lb of dry flue gas.

The capacity of the flue gas to produce solids depends on the flue gas inlet temperature and humidity, and the solids content, in weight % of the inlet waste liquor. Table 2 shows this relationship for typical inlet flue gas having 10% humidity.

TABLE 2

Gas Drying Capacity
lbs dry solids produced/lb flue gas

| Inlet Flue Gas T,°F. at 10% Humidity | Liquor Solids Content weight % | | | | | |
|---|---|---|---|---|---|---|
| | 5% | 10% | 15% | 30% | 40% | 50% |
| 300° F. | .00195 | .00390 | .0062 | .0151 | .0234 | .0352 |
| 400° F. | .00351 | .00742 | .01177 | .0286 | .0445 | .0667 |
| 500° F. | .00517 | .0109 | .01734 | .0421 | .0655 | .0983 |
| 600° F. | .00659 | .01392 | .0221 | .0537 | .0835 | .1253 |
| 700° F. | .00807 | .01695 | .0269 | .0653 | .1016 | .1525 |
| 800° F. | .00944 | .01995 | .0317 | .0769 | .1196 | .1795 |

Thus, inlet gas at 300° F., 10% H$_2$O will produce 0.00195 lbs of solids from a 5% liquor solution per lb of flue gas, and 0.1795 lbs of solids from a 50% liquor solution per lb of flue gas. There are about 12.83 cu ft gas/lb of gas at STP conditions (32° F., 1 atmosphere) so the above two cases would require (760° F.×12.83)/492° F.=19.90 cu ft/lb; (19.90/0.00195)=10,200 cu ft gas to produce 1 lb solids at 300° F., and (1260° F.×12.83)/492° F.=33.0 cu ft/lb; (33.00/0.1795)=183 cu ft gas to produce 1 lb solids at 800° F.

As an alternative, the sodium sulfate liquor may be disposed of via line 20 or may be regenerated as above described. The sodium sulfate solution may be disposed of by deep well disposal, playa lake disposal, deep sea dumping or conversion to an insoluble salt. In the alternative, the sodium sulfate values may be recovered as such, or converted to sodium alkali, and the sulfur values obtained for use of disposal.

A second alternative is to pass the middling liquor 21 directly to the spray dryer via line 22. This results in a mixed ammonium or sodium sulfite and sulfate product in the spray dryer. This is less preferred because the ammonium or sodium sulfite values have a chemical oxygen demand which makes their disposal more difficult. However, some oxidation of sulfite to sulfate can occur in the spray dryer where the flue gas oxygen content is adequate.

A third alternative is to pass the middling liquor 21 directly to waste disposal or regeneration via line 23. The regeneration may be by the so-called double alkali process wherein the sodium sulfite/sulfate solution (or the sodium sulfate solution as in the case of line 20) is reacted with limestone or/and lime to produce calcium sulfite/sulfate while regenerating the sodium hydroxide. The regenerated sodium hydroxide is recycled to line 9 while the calcium sulfite/sulfate sludge is disposed of by conventional pond methods.

As can be seen from the above description, the process results in a first-stage precleaning of the flue gases while at the same time producing the spray-dried product before the flue gases are passed into the absorber. The spray dryer is thus run at a higher temperature than the absorber and substantially total utilization of the ammonium or sodium sorbent is achieved by the combination of the control of solids content, liquid-to-gas ratio, the percentage of recycle of the sorbent from recycle tank 11 via line 15, and residual SO$_2$ pick-up in the spray dryer. At the same time, fly ash not removed in the spray dryer cyclone section is trapped by contact with the sorbent liquor in the absorber 3 and removed from the recycle tank 11 by settling. The spray dryer cyclone operates more efficiently since the total grain loading is higher than if the spray dryer were located downstream of the absorber. Unlike the prior art in which spray dryers are used as reactors, the process and apparatus of this invention employs only the reaction product liquor in the spray dryer, while the SO$_x$ sorption reaction is, except for a small percentage of precleaning in the spray dryer, substantially confined to the separate absorber-reactor. The apparatus and process of this invention may remove in excess of 95% of both SO$_x$ and fly ash, when the sorbent quantity, solids content, l/g ratio, and temperatures are held within the above-described parameters. Sorbent utilization will typically be above 90% and approach 100%, with approximately 1–5% SO$_x$ removal taking place in the spray dryer.

By way of disposal of the (NH$_4$)$_2$SO$_3$/SO$_4$ or Na$_2$SO$_3$/SO$_4$ wastes, they may be processed in accordance with the "FERSONA TM" process as disclosed and claimed in copending application Ser. No. 411,367, or in Ser. No. 411,365, now U.S. Pat. No. 3,876,537. The Na$_2$SO$_3$/SO$_4$ may also be processed by the "SINTERNA ™" process as disclosed and claimed in copending application Ser. No. 411,366, now U.S. Pat. No. 3,962,080. The disclosures of those applications are incorporated by reference herein.

It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. Method of removal of SO$_x$ and fly ash particulates from hot flue gases comprising:
   (a) passing said hot flue gases through a flue gases pretreatment and waste products dry collection zone;
   (b) introducing an aqueous reaction products liquor containing ammonium or sodium sulfur oxide salts and at least a portion of said fly ash in a slurry form into said hot flue gases in a first portion of said pretreatment-dry collection zone in a finely divided condition and at a solids content sufficient to permit evaporation of substantially all of the water content of said liquor and produce dried particles of ammonium and sodium sulfur oxide salts;
   (c) removing a first, major portion of said dried salts particles in association with fly ash in a second portion of said pretreatment-dry collection zone to produce a partially cleaned flue gas containing a minor portion of said dried salts particles, and said fly ash;
   (d) introducing said partially cleaned flue gas containing said fly ash into a reaction zone;
   (e) contacting said partially cleaned flue gas containing said fly ash in said reaction zone with an aqueous ammonium or sodium alkali SO$_x$ sorbent liquor selected from NH$_4$OH, (NH$_4$)$_2$CO$_3$, NH$_4$HCO$_3$, NaOH, Na$_2$CO$_3$, NaHCO$_3$ and mixtures thereof for a time sufficient:
   (i) to react SO$_2$ and SO$_3$ in said partially cleaned flue gas therewith to form said reaction products liquor and fly ash slurry;
   (ii) to collect dried salts particles and said fly ash from said partially cleaned flue gas, and
   (iii) to form substantially clean flue gas;
   (f) exhausting said clean flue gas from said reaction zone; and
   (g) passing reaction product liquor containing at least a portion of said fly ash in slurry form from said reaction zone to said pretreatment-dry collection zone.

2. A process as in claim 1 wherein:
   (a) the solids content ratio of said reaction products liquor bleed stream is maintained between about 5–50 weight percent in said liquor.

3. A process as in claim 2 wherein:
   (a) the temperature of dirty flue gases entering said pretreatment-collection zone is maintained in the range of about 275°–800° F.;
   (b) and the average temperature of said partly cleaned flue gas is maintained between about 100°–180° F.

4. A process as in claim 3 which includes:
   (a) recycling a portion of said reaction products liquor to said reaction zone to maintain the average residence time of said sorbent alkali in said reaction zone sufficient to utilize more than 80% of said alkali values, and to maintain said solids content level in said reaction products liquor.

5. A process as in claim 4 which includes:
   (a) passing said reaction product liquor and fly ash slurry to a settling zone; and
   (b) separating at least a portion of said fly ash particulates entrained in said liquor from said slurry prior to passing said liquor to said pretreatment-dry collection zone.

6. A process as in claim 5 which includes:
   (a) oxidizing sulfite values in said reaction product liquor to sulfate prior to passing said reaction product liquor to said pretreatment-collection zone.

* * * * *